United States Patent
Clemons et al.

(10) Patent No.: US 7,717,448 B2
(45) Date of Patent: May 18, 2010

(54) RATCHET-ACTION DRIVE MECHANISM FOR HUMAN POWER

(75) Inventors: Brian Roger Clemons, 2627 Fairfield Dr., Marietta, GA (US) 30064; Michael Christopher Dean, Alpharetta, GA (US)

(73) Assignee: Brian Roger Clemons, Marietta, GA (US)

(*) Notice: Subject to any disclaimer, the term of this patent is extended or adjusted under 35 U.S.C. 154(b) by 233 days.

(21) Appl. No.: 12/006,021

(22) Filed: Dec. 29, 2007

(65) Prior Publication Data

US 2008/0174086 A1 Jul. 24, 2008

Related U.S. Application Data

(60) Provisional application No. 60/879,637, filed on Jan. 10, 2007.

(51) Int. Cl.
*B62M 1/04* (2006.01)
(52) U.S. Cl. .................... 280/258; 280/253
(58) Field of Classification Search ............ 280/258, 280/253
See application file for complete search history.

(56) References Cited

U.S. PATENT DOCUMENTS

| | | | | |
|---|---|---|---|---|
| 3,661,404 A * | 5/1972 | Bossaer | ............ | 280/255 |
| 4,108,459 A * | 8/1978 | Alvigini | ............ | 280/215 |
| 4,445,701 A * | 5/1984 | Stroud | ............ | 280/217 |
| 4,456,276 A | 6/1984 | Bortolin | | |
| 4,564,206 A * | 1/1986 | Lenhardt | ............ | 280/252 |
| 4,574,649 A * | 3/1986 | Seol | ............ | 74/138 |
| 4,630,839 A * | 12/1986 | Seol | ............ | 280/255 |
| 4,666,173 A * | 5/1987 | Graham | ............ | 280/255 |
| 5,242,182 A * | 9/1993 | Bezerra et al. | ............ | 280/253 |
| 5,335,927 A * | 8/1994 | Islas | ............ | 280/255 |
| 5,405,157 A * | 4/1995 | Bezerra et al. | ............ | 280/253 |
| 5,785,337 A * | 7/1998 | Ming | ............ | 280/255 |
| 5,826,897 A | 10/1998 | Beard | | |
| 5,988,662 A | 11/1999 | Staehlin | | |
| 6,336,646 B1 * | 1/2002 | Bernardini | ............ | 280/252 |
| 6,419,251 B1 * | 7/2002 | Chueh | ............ | 280/221 |
| 6,554,309 B2 * | 4/2003 | Thir | ............ | 280/253 |
| 6,663,127 B2 * | 12/2003 | Miller | ............ | 280/256 |
| 6,749,211 B1 | 6/2004 | Yliniemi | | |
| 7,011,376 B2 * | 3/2006 | Sepulveda | ............ | 301/2.5 |
| 7,293,789 B1 | 11/2007 | Efros | | |
| 7,510,201 B2 * | 3/2009 | Scarborough | ............ | 280/253 |

* cited by examiner

*Primary Examiner*—Lesley Morris
*Assistant Examiner*—Michael R Stabley

(57) ABSTRACT

The invention is an improved lever drive arrangement for human powered machines. Independent levers are connected directly to a primary drive arrangement positioned behind the rider comprised of one-way clutch/s connected to a common shaft connected to a sprocket that drives by chain a series of two reductions called a secondary drive arrangement and a tertiary drive arrangement prior to engaging the final drive element. The positioning of the primary drive arrangement behind the rider better enables upright riding by a person and better enables increases in lever length thereby increasing mechanical advantage is possible for producing greater torque to drive larger or multiple reductions. The independent lever arrangement allows a rider to deviate from the traditional opposing circular or up and down cadence of the rider's limbs making possible a variety of limb pumping movements by one or more limbs.

1 Claim, 5 Drawing Sheets

One Embodiment of the Invention

One Embodiment of the Invention

Primary Drive Arrangement

Secondary Drive Arrangement

Tertiary Drive Arrangement

Figure 1:
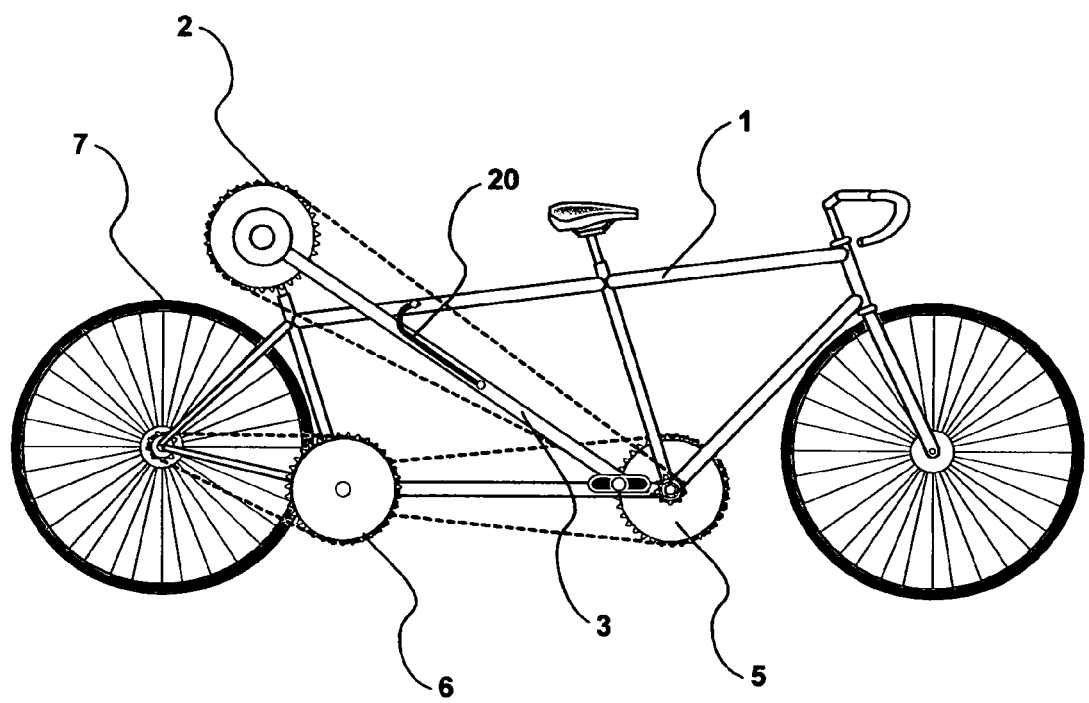

Layout of the Primary, Secondary, Tertiary, and Final Drive Output Rotating Element

RATCHET-ACTION DRIVE MECHANISM FOR HUMAN POWER

CROSS-REFERENCE TO RELATED APPLICATIONS

This application claims the benefit of Provisional Patent Application No. 60/879,637, filed Jan. 10, 2007 by Brian Clemons, which is incorporated by reference.

FEDERALLY SPONSORED RESEARCH

Not Applicable

SEQUENCE LISTING OR PROGRAM

Not Applicable

BACKGROUND OF THE INVENTION

Prior Art

1. Field of Invention

This invention relates to human powered machines used for transportation or producing a rotational output that traditionally transforms the reciprocating motion of the human limb/s into forward motion, specifically the improvement of input mechanisms and mechanical advantages achieved for human powered rotational output; specifically bicycle-like machines used by a rider in the traditional upright manner.

2. Background

Normally, a bicycle-like drive train begins with pedals which rotate crank arms, which are held in axis by the bottom bracket. Attached to one crank arm may be one or more sprockets which drive the chain, which in turn rotates the rear wheel via the rear sprockets. A gearing system is used to vary the number of rear wheel revolutions produced by each turn of the pedals. When the bicycle chain shifts to a larger rear sprocket, or to a smaller front sprocket, to a lower gear, every cycle on the pedal leads to fewer rotations in the freewheel attached to a rear wheel. This allows the force required to move same distance to be distributed over more pedal cycles. The reverse process allows the cyclist to spend fewer pedal cycles to maintain a higher speed, but with more effort per cycle. Upright bicycles have some advantages over recumbent bicycles. They are easier to pedal uphill, because they are usually lighter and the rider can stand up on the pedals and use his or her body weight. Previously, the power and speed generated for locomotion or rotational output, most commonly used on bicycles, utilizes a circular bipedal motion limiting the leverage available on the crank mechanism to the physical movements of the human body. This, in turn, can limit the input to output ratios possible to the physical strength of the operator's limbs.

DESCRIPTION OF PRIOR ART

Other attempts to utilize a ratchet-like lever input mechanism have succeeded in transforming motion from linear to rotational for the purpose of accommodating physical limitations of operators, endurance and efficiency training, and allowing for the use of a variety of transmission devices, but these had and still have significant limitations. Human powered lever drives have been designed to replace circular drives with oscillating lever motion. Such lever drives use a lever configuration in which the levers are oscillated in a ratcheting motion to generate forward motion. The Human Powered Vehicle With At Least Two Wheels in U.S. Pat. No. 6,336,646 is a human propulsion vehicle with at least two wheels comprising a first frame, handlebars rotatably mounted onto the first frame and connected to at least one wheel, a second frame integrally connected to the first frame at the front portion thereof and above said handlebars, and a seat and a seat back for the person is provided, the vehicle being characterized in that it further comprises a pair of cranks for driving the propulsion energy with a swinging reciprocating motion around a axis of rotation, and a crown connected thereto apted to convert the swinging reciprocating motion of the cranks in a one-way rotary motion around said axis of rotation and the seat back being apt to thrust reaction member for the person when forcing on the cranks. The first driving means is located forward of the rider above the handlebars suitable for realizing a swinging reciprocating motion. The Systems and methods for propelling a vehicle in U.S. Pat. No. 7,011,376 discloses systems and methods for converting linear motion into circular motion comprising: a wheel configured to rotate; a surface; a first ratchet; a first member, the first member configured to apply force to the wheel, via the ratchet, at a first time when the first member moves in a first direction on the surface; and a second member configured to apply a force to the first member, the surface having an incline relative to a direction of movement of the second member. The Lever Driven Bicycle in U.S. Pat. No. 5,988,662 relates to an improved lever driven bicycle including a shifting mechanism for controlling a drive mechanism for controlling a drive ratio between the oscillating lever and the drive wheel. The drive lever arrangement may be located about the front or rear wheels of the bicycle and, when about the rear wheel, may include a sole lever or dual levers. The drive lever arrangement includes a drive lever, a force applicator, a shifting mechanism, and a force converter which together transforms the oscillating displacement of the lever to a rotation of the drive wheel. The shifting mechanism includes a slide block located about the lever which engages with the drive lever upon downward motion of the drive lever and controllably slides along the driver lever upon upward motion of the drive lever. The position of the slide block corresponds to a drive ratio between drive lever and the drive wheel. The Propulsion system for bicycles in U.S. Pat. No. 5,785,337 the propulsion system includes first and second levers pivotly mounted to the frame of the bicycle and the cyclist operates the bicycle by pushing the first ends of the levers in up and down directions. In one embodiment, a translation mechanism is connected to the second ends of the levers for translating the up and down movement of the levers into rotational movement of the rear wheel of the bicycle. In another embodiment, an additional translation mechanism is connected to the first ends of the levers for translating up and down movement of the first ends of the levers into rotational movement of the rear wheel of the bicycle. The Pedaled propulsion system in U.S. Pat. No. 5,335,927 describing a drive mechanism for a pedaled vehicle employs foot levers mounted on the vehicle frame, a rotary drive mechanism, and one way rotary members. A chain or toothed rack can engage the rotary members to provide reciprocal oscillatory motion, which is then converted to one-way rotary motion. A synchronizing mechanism ensures that motion of each lever produces corresponding motion in the opposite direction by the other lever. The Propulsion and speed change mechanism for lever propelled bicycles in U.S. Pat. No. 4,574,649 describes propulsion and speed change mechanism for lever propelled bicycles having a pair of propulsion levers, each of which is built in one piece with a speed change arm and mounted in each side of the main shaft portion at the bottom of the bicycle frame. A rear axle and a hub are mounted on the rear shaft portion. A one-way clutch mechanism has roller-type free wheels are installed at both ends of the rear axle. Chains, the ends of which may be connected together with a see-saw cable', are entrained around gears and guide rollers. The free ends of the chains are connected by connecting bars having pins to the speed change arm. Pivotally mounted members of triangular shape and a cam bar operated by a speed control knob are used to change the effective length of the arm for speed control. The Bicycle Assembly in U.S. Pat. No. 4,456,276 describes a bicycle having a frame, a driven wheel rotatably supported on the frame, a drive sprocket rotatably mounted on the frame, a driven sprocket fixed to said wheel, a chain extending between the sprockets; a pair of levers pivotally attached to the frame, and a pair of links extending between the drive sprocket and levers, a pedal fixed to the extremity of each lever, and wherein said drive sprocket is rotated by the reciprocation of said pedals. The Bicycle with reciprocal pedal levers having shiftable pivot axis for transmission ratio change in U.S. Pat. No. 6,749,211 is described an invention related to a cycle, such as a bicycle, having reciprocal pedal levers for propelling at least one wheel of the cycle. The cycle has a frame that includes a rack, a left pedal lever with a rack and a right pedal lever with a rack. A pinion is carried on the frame with the pinion in simultaneous engagement with the racks on the frame and the pedal levers. A plurality of bearings are mounted around the pinion comprising at least a first bearing providing rotation between the pinion and the frame, a second bearing providing rotation between the pinion and the right pedal lever, and a third bearing providing rotation between the pinion and the left pedal lever. The Rider-propelled wheeled land vehicle in U.S. Pat. No. 5,405,157 is provided an occupant-propelled land vehicle, such as a bicycle, having a frame, at least one front wheel, at least one rear wheel, and a seat for the rider of the vehicle, supported by the frame, wherein two levers, each having a front end and a back end, are pivoted on the frame on each side forwardly of the rear wheel and at a point substantially closer to the back end than to the front end. Two rigidly interconnected and spaced-apart parallel discs, one of the discs being toothed, are associated with an upper portion of the rear wheel. Connecting rods are pivotally connected to the back ends of the levers and are eccentrically-rotatably connected to the discs, a sprocket wheel is connected to the axle of rear wheel, and a driving chain is included in a connection between the toothed disc and the rear-wheel sprocket wheel. Downward pressure on the front end of a lever will cause the connecting rod at the back end of the lever to move upwardly to cause the associated disc and the rigidly-joined disc to rotate, which rotation is transmitted by the chain to the rear-wheel sprocket wheel and thereby to the rear wheel of the vehicle to cause movement of the vehicle over the land. The Propulsion mechanism for lever propelled bicycles in U.S. Pat. No. 4,630,839 describes a bicycle having pivoted lever pedal system and lever arm length or gear ratio change devices. Propulsion forces from the lever pedals are transferred via the lever arm length change device through a flexible interconnecting cable and pulley system to a rear drive hub assembly having a pair of one-way clutches which allow the transfer of forward driving forces and enable the bicycle to be rolled back. The Wide power range bicycle with positive intuitive gear shifting system in U.S. Pat. No. 7,293,789 describes A pedal lever type bicycle includes a pedal lever having a front portion and a rear portion, with an intermediate pivot point located substantially above the center of the rear wheel, and to the rear of the front of the rear wheel. The rear portion of the pedal lever has dog-leg configuration with a slider that is attached to a drive chain. The slider is mounted on a straight section of the rear portion of the pedal lever which extends slightly above and to the rear of the rear wheel hub, so that the chain exerts a force to move the slider outwardly on the rear portion of the pedal lever when it is in a lower position, and in the opposite direction when it is raised. Changes of mechanical advantage of 3 or 4 to 1 are available with this configuration of the pedal lever. The bicycle incorporates positive intuitive gear controls and quick release mechanisms for all major components of the propulsion system. The Manually powered vehicle having a flywheel assisted drive in U.S. Pat. No. 5,826,897 describes a human powered vehicle, such as a wheelchair or recumbent vehicle that has a flywheel assisted drive. The human powered vehicle includes a frame that rides upon at least two wheels. A seat is supported by the frame. Adjacent to either side of the seat is a rowing lever used to turn the flywheel. Each rowing lever is coupled to a mechanism that converts the reciprocal movement of the rowing lever into a rotational movement that is applied to the flywheel. The flywheel is coupled to at least one of the wheels that supports the frame, via a transmission that selectively transfers the rotational movement of the flywheel to the wheels. As a result, the rowing levers do not directly drive the wheels of the vehicle. Rather, the rowing levers drive the flywheel and the flywheel drives the wheels. By using a transmission that selectively couples the flywheel to the vehicle's wheels, the transmission can be set in a neutral condition whereby the rotational movement of the flywheel is not transferred to the vehicle's wheels. As a result, the rowing levers can be used to drive the flywheel to a high rate of speed before the flywheel engages the vehicles wheels. These previously conceived human powered lever drive devices result in performance comparable to the typical bicycle and like human powered machines relying on the physical capability of the operator to increase output or a recumbent position with the first drive element forward of the rider, limiting the practical lever length, to provide a platform for thrust rather than utilizing the rider's weight along with traditional rider mechanics, such as pulling up on hand holds, to provide force in addition to the riders weight downward on drive components.

SUMMARY OF INVENTION

In accordance with one embodiment, the invention is an improved lever drive arrangement for human powered machines. Independent levers with independent lever return mechanisms are connected directly to a primary drive arrangement positioned behind the rider comprised of one-way clutch/s connected to a common shaft connected to a sprocket that drives by chain a series of two reductions called a secondary drive arrangement and a tertiary drive arrangement prior to engaging the final drive element; the final drive element is a rear wheel in this embodiment. The positioning of the primary drive arrangement behind the rider better enables upright riding by a person and better enables increases in lever length thereby increasing mechanical advantage is possible for producing greater torque to drive larger or multiple reductions. The independent lever and lever return mechanisms allow a rider to deviate from the traditional opposing circular or up and down cadence of the rider's limbs making possible a variety of limb pumping movements by one or more limbs.

DRAWINGS

Figures

FIG. 1 shows one embodiment; a bicycle with many of the accoutrements found on conventional crank driven bicycles, with the exception of the levers, primary drive arrangement, secondary drive arrangement, and tertiary drive arrangement.

Figure 2:
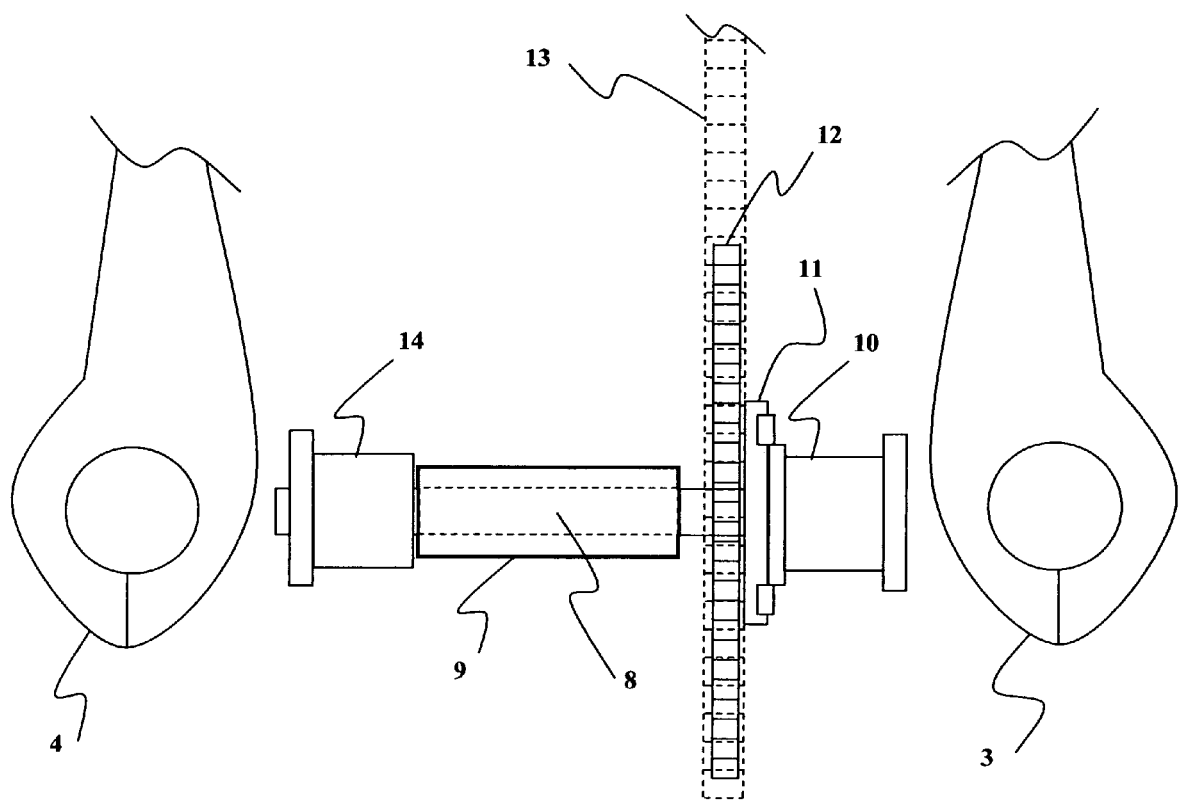
Figure 3:
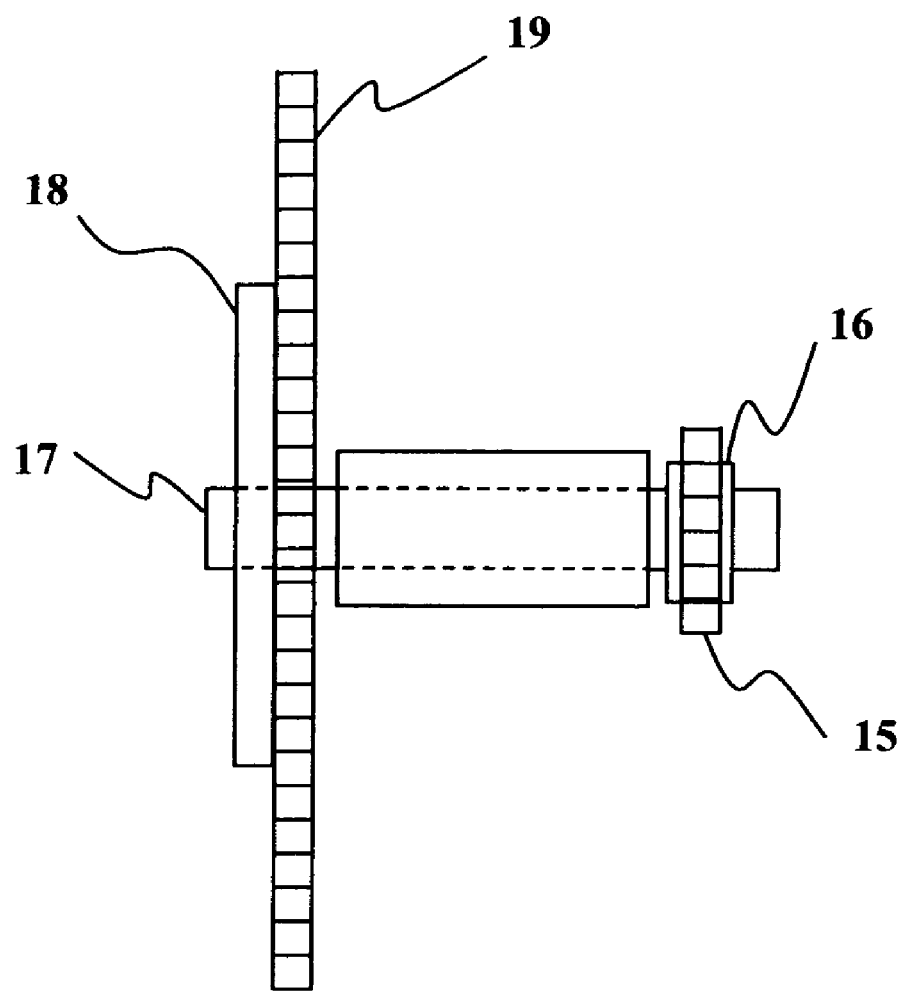
Figure 4:
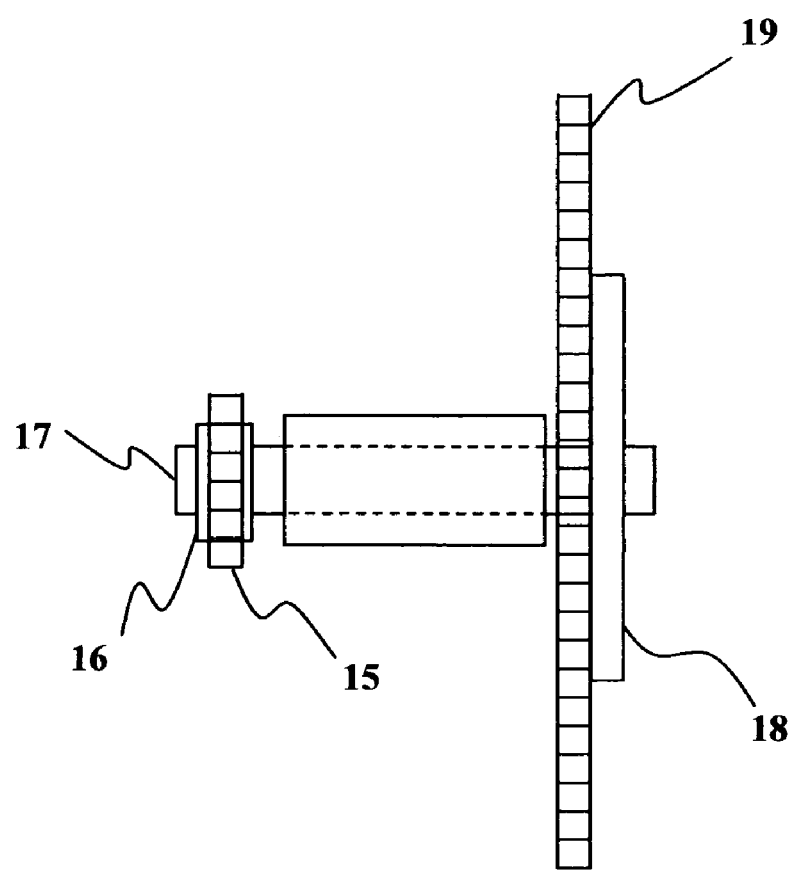
Figure 5:
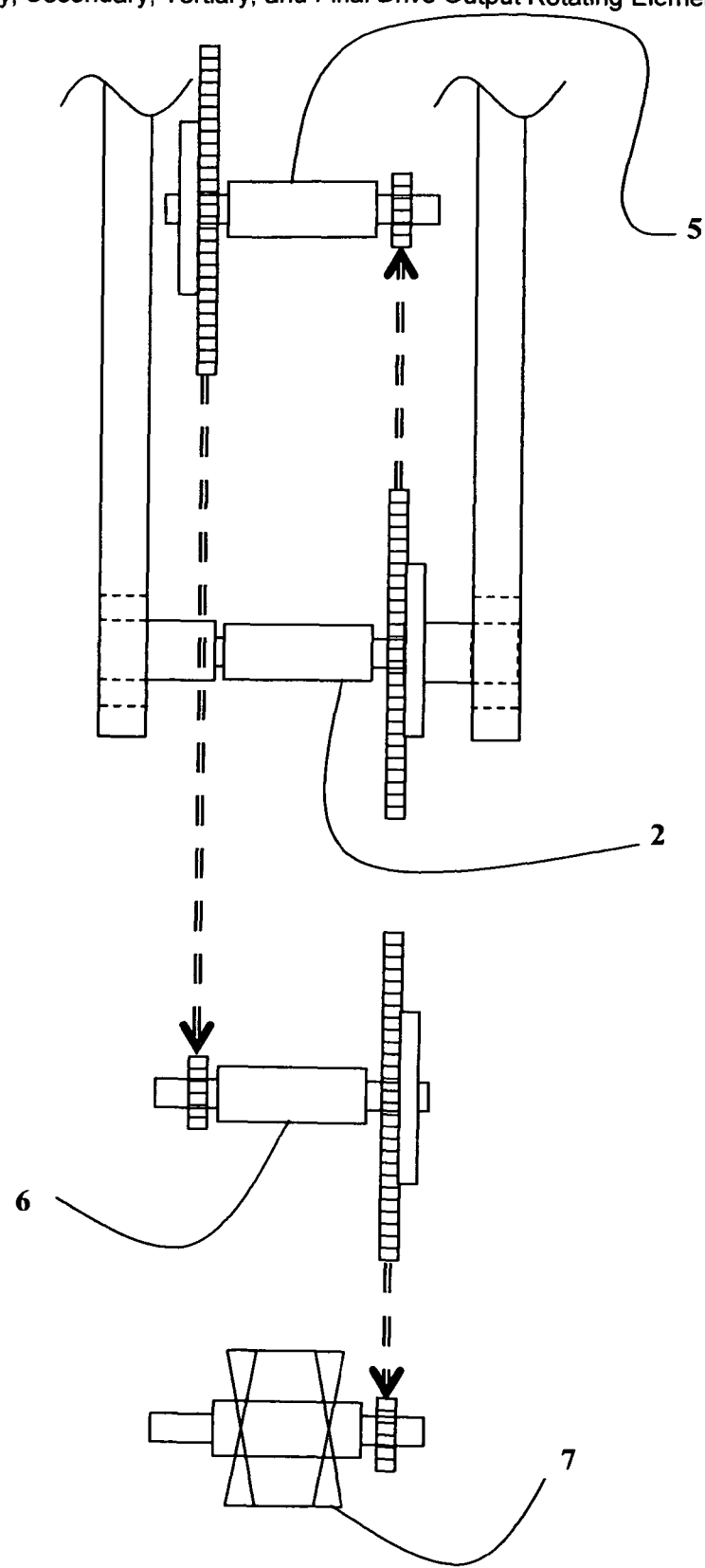

FIG. 2 shows a primary drive arrangement.
FIG. 3 shows a secondary drive arrangement.
FIG. 4 shows a tertiary drive arrangement.
FIG. 5 shows a layout of the primary, secondary, tertiary, and final drive arrangements.

DRAWINGS

Reference Numerals

| | |
|---|---|
| 1 | bicycle frame |
| 2 | primary drive arrangement |
| 3 | ratcheting lever |
| 4 | ratcheting lever |
| 5 | secondary drive arrangement |
| 6 | tertiary drive arrangement |
| 7 | final drive element |
| 8 | shaft |
| 9 | bracket housing |
| 10 | one way clutch |
| 11 | chain wheel to one way clutch connecting disk |
| 12 | chain wheel |
| 13 | chain |
| 14 | one way clutch |
| 15 | input one way freewheel |
| 16 | freewheel to shaft connector |
| 17 | shaft |
| 18 | shaft output to chain wheel connector |
| 19 | chain wheel |
| 20 | independent return mechanism; a leaf spring in this embodiment |
| 21 | independent return mechanism; a leaf spring in this embodiment |

DETAILED DESCRIPTION

In FIG. 1 of the drawings, a side view is given of an embodiment of the invention as a bicycle drive mechanism including a bicycle frame 1, including elements normally found on conventional crank driven bicycle with the exception of lever drive and reduction arrangements, primary drive arrangement 2, ratcheting lever 3, secondary drive arrangement 5, tertiary drive arrangement 6, and final drive element 7. The final drive element 7 is a rear wheel in this embodiment. The bicycle of FIG. 1 is given forward locomotion by the ratcheting up and down of the levers by the rider's limbs. The levers are reset to the up position by independent return mechanism 20; a curved leaf spring in this embodiment, optionally a coil spring or any other obvious independent return mechanism. Said ratcheting levers operate independently, enabling the operator to pump the pedals in synchronous, opposing, and any other manner or combination that consists of up and down motion transmitted from the operator's limb to said primary drive arrangement.

Shown in FIG. 2 of the drawings is the primary drive arrangement and racketing levers 3 and 4, a shaft 8, fits into bracket housing 9, with ratcheting levers 3 and 4, situated one lever to each side. A drive side ratcheting lever arrangement includes a one way clutch 10, a chain wheel to one way clutch connecting disk 11, attached to shaft 8, a chain wheel 12, a chain 13, and lever 3 detached. Opposing drive side ratcheting lever arrangement with a one way clutch 14, attached to shaft 8, and lever 4 detached.

In FIG. 3 of the drawings is a view of secondary drive arrangement, an input one way freewheel 15, a freewheel to shaft connector 16, a shaft 17, a shaft output to chain wheel connector 18, and a chain wheel 19.

In FIG. 4 of the drawings is a view of the tertiary drive arrangement, an input chain wheel 19, a shaft input to chain wheel connector 18, a shaft 17, a freewheel to shaft connector 16, and an output one way freewheel 15.

In FIG. 5 of the drawings a proposed top view layout of primary drive arrangement 2, secondary drive arrangement 5, tertiary drive arrangement 6, and final drive output rotating element 7; rear wheel in this embodiment.

Operation

To operate the foregoing described embodiment, levers 3 and 4, are stroked in a reciprocating up and down motion driving the chain wheel 12, in a one way rotation with each stroke. The independent return mechanisms 20 and 21 reset the levers in the up position. Chain wheel 12, connected to an input one way freewheel 15, with a chain 13, drives the one way freewheel 15, in the engaged direction of rotation. The rotation is transmitted through the shaft 17, and a shaft output to chain wheel connector 18, to a chain wheel 19, increasing the rotational output. The rotational output continues to be increased through the secondary drive arrangement 5 then to the tertiary drive arrangement 6. The output rotation of tertiary drive arrangement 6, is transmitted to the final drive element; a rear wheel 7, resulting in forward locomotion in this embodiment.

CONCLUSION, RAMIFICATIONS, AND SCOPE OF INVENTION

Thus, the reader will see that at least one embodiment of the Ratchet-Action Drive Mechanism for Human Power is an improved lever drive assembly that makes possible greater force and rotational movement to a propelling element than a traditional bicycle type crank drive assembly. By placing the fulcrum at the greatest extent, improvements in torque generation capability are achieved. Positioning the primary drive arrangement behind the rider makes possible greater lever length and upright riding practical. Through the use of a lever with a length greater than common bicycle crank arms greater forces are generated for performing work while decreasing the force required for equilibrium with the load end of the lever. Gains in motion are achieved through reductions referred to as the secondary drive arrangement and tertiary drive arrangements. The required input and the resulting output is the result of the lever length and the reduction configuration improving the performance capabilities of human powered machines accordingly.

While my description contains many specifications, these should not be construed as limitations on the scope of invention, but rather an exemplification of one preferred embodiment thereof. Many other variations are possible. The embodiment is an improvement that is adapted to human powered machines requiring rotational output. For example, the embodiment is fitted to not only bicycles, but also three and four wheeled vehicles. By substituting the preferred embodiment rear wheel assembly with a marine propeller, the invention is used to propel watercraft to include boats and submarines. By substituting the preferred embodiment's final drive element, a rear wheel assembly, with an aeronautical propeller, the embodiment is used to propel aircraft. The output of the preferred embodiment final drive element is used for the generation of electricity by rotating generation equipment. The embodiment is adapted for multiple operators by the addition of multiple drive arrangements and sets of ratcheting levers. Two sets of two opposing lever assemblies are attached to the shaft of the primary drive assembly for input from two operators or a single operator using both legs and arms. A lever is shaped to accommodate space and interference with other parts. Transferring motion from the primary drive arrangement through the secondary drive arrangement and tertiary drive arrangement is accomplished by chain and chain wheels, as in the embodiment, as well as, by belt and pulley, direct gear to gear, and a combination of the aforementioned. Accordingly, the scope of the invention should be determined not by the embodiment illustrated, but by the appended claims and their legal equivalents.

We claim:

1. A bicycle with a human powered lever drive arrangement comprising: a frame; at least one lever of sufficient length connected to said frame and shaped to accommodate a one way clutch; an independent mechanical return mechanism attached to said frame and said lever; said one way clutch having a mechanical linkage to a rotational primary drive chain wheel; said primary drive chain wheel positioned behind the rider's position; a chain linkage between said primary drive chain wheel and a secondary drive chain wheel; a chain linkage between said secondary drive chain wheel and a tertiary drive chain wheel; a chain linkage between said tertiary drive chain wheel and a rotating final drive wheel whereby force is applied to said lever's end opposite said one way clutch connected to the primary drive chain wheel; wherein linear movement of said lever produces torque converted to rotational speed through secondary and tertiary drive chain wheels to drive a rotating final drive wheel.

* * * * *